United States Patent
Kawano et al.

(10) Patent No.: US 9,957,059 B2
(45) Date of Patent: May 1, 2018

(54) FUEL TANK, FUEL PIPE, AND AIRCRAFT

(71) Applicant: MITSUBISHI AIRCRAFT CORPORATION, Aichi (JP)

(72) Inventors: Shingo Kawano, Tokyo (JP); Atsushi Fujii, Tokyo (JP); Yuichi Kanemaki, Tokyo (JP); Ushio Komoda, Aichi (JP); Toshiyuki Umemoto, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 267 days.

(21) Appl. No.: 14/623,802

(22) Filed: Feb. 17, 2015

(65) Prior Publication Data
US 2015/0246732 A1    Sep. 3, 2015

(30) Foreign Application Priority Data

Feb. 18, 2014 (JP) .................................. 2014-28917
Feb. 16, 2015 (JP) .................................. 2015-27181

(51) Int. Cl.
*B64D 37/02* (2006.01)
*B64D 37/34* (2006.01)
*B64D 37/20* (2006.01)

(52) U.S. Cl.
CPC ............. *B64D 37/34* (2013.01); *B64D 37/02* (2013.01); *B64D 37/20* (2013.01); *Y02T 50/44* (2013.01)

(58) Field of Classification Search
CPC ...... B64D 37/00; B64D 37/005; B64D 37/06; B64D 37/30; B64D 37/34
See application file for complete search history.

(56) References Cited

U.S. PATENT DOCUMENTS

| | | | | |
|---|---|---|---|---|
| 5,252,203 A * | 10/1993 | Lyda | ................. | B01D 17/0202 210/172.5 |
| 6,178,991 B1 * | 1/2001 | Schiwek | ................. | B60P 3/22 137/351 |
| 8,248,748 B2 * | 8/2012 | Ciolczyk | ................. | F16L 9/125 361/212 |
| 9,475,586 B2 * | 10/2016 | Hottin | ................. | B29C 70/88 |
| 2004/0137290 A1 * | 7/2004 | Woods | ................. | B01J 7/00 204/263 |
| 2011/0180242 A1 * | 7/2011 | Urata | ................. | F28F 9/02 165/166 |
| 2011/0232293 A1 * | 9/2011 | Leese | ................. | B64D 37/34 60/772 |
| 2017/0189832 A1 * | 7/2017 | Fleischhaker | ........ | B01D 17/045 |

FOREIGN PATENT DOCUMENTS

| JP | 05-231257 A1 | 9/1993 |
|---|---|---|
| JP | 11-347304 A1 | 12/1999 |

OTHER PUBLICATIONS

Schientific Spine, PEEK (Polyether Ether Ketone), http://www.scientificspine.com/spinal-materials/peek.html, Feb. 23, 2012.*

* cited by examiner

*Primary Examiner* — Brian M O'Hara
(74) *Attorney, Agent, or Firm* — Pearne & Gordon LLP

(57) ABSTRACT

A fuel tank that stores fuel to be fed to a fuel supply destination through a pipe, wherein a whole or a portion of a storage fuel contact portion in contact with the fuel within the fuel tank is subjected to surface finishing for imparting hydrophilicity.

5 Claims, 9 Drawing Sheets

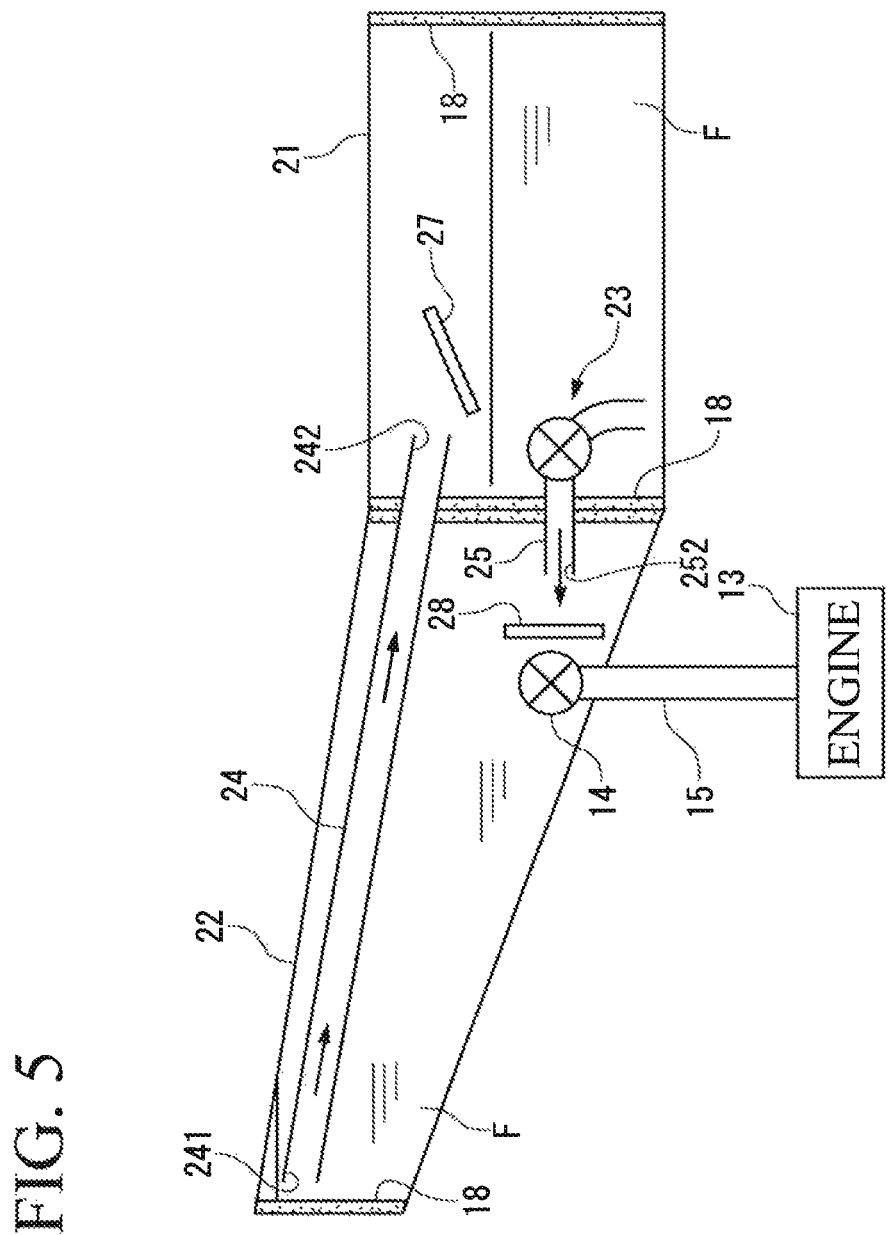

FUEL TANK, FUEL PIPE, AND AIRCRAFT

BACKGROUND OF THE INVENTION

Field of the Invention

The present invention relates to a fuel supply apparatus which is used for supplying fuel to a supply destination. More specifically, the present invention relates to a fuel tank that stores fuel, and a fuel pipe or the like that is interposed between the fuel tank and the supply destination (an engine or the like).

The present invention also relates to an aircraft including the fuel supply apparatus.

Description of the Related Art

Fuel supplied to an engine of aircraft is stored in an inner portion of a main wing used as a fuel tank. The fuel in the fuel tank is extracted from the fuel tank by a fuel pump, and is fed to the engine through a fuel pipe.

In engines of not only aircraft but of all kinds, generally, combustion efficiency is lowered when fuel contains water. Thus, there has been known a technique for separating and removing water from fuel by settling water by use of a filtering device having a porous membrane through which only water out of fuel and water passes (Japanese Patent Laid-Open No. 05-231257), or by adding a carbon-based material (a pellet of carbon black or the like) to fuel, stirring the carbon-based material and the fuel, and coagulating and solidifying the carbon-based material and the fuel to separate them from water (Japanese Patent Laid-Open No. 11-347304).

In aircraft, the temperature of surrounding outside air becomes extremely low along with an increase in flight altitude.

When fuel tanks of not only aircraft but of all kinds are cooled in a subfreezing environment, and fuel in the tanks is also cooled, water in the fuel freezes. In this case, an ice grain does not pass through the filtering membrane, and the fuel and the carbon-based material are not coagulated and solidified well. Thus, it becomes difficult to separate the water from the fuel.

Therefore, the water contained in the fuel may not be sufficiently removed, and the water in the fuel may solidify in a fuel pipe and adhere to an inner wall of the pipe. If the inside of the fuel pipe is narrowed by the adhesion of ice, the fuel becomes difficult to flow in the fuel pipe, so that fuel supply to the engine is disturbed.

Moreover, the ice adhering to the inside of the fuel pipe could fall away from the fuel pipe at once, and a lump of ice could block the inside of the fuel pipe or a fuel inlet of the engine due to an increase in outside air temperature along with a decrease in the altitude of aircraft, an increase in the flow rate of fuel by an increase in thrust, or due to vibration.

Furthermore, when the filtering membrane is used, the filtering membrane may be clogged. Thus, frequent maintenance and replacement of the filtering membrane are required. Also, when the carbon-based material is added, a tank to which the fuel is transferred from the fuel tank is required for separating the fuel and moisture by coagulation and solidification by adding the carbon-based material.

It is very difficult to provide the filtering device and the tank separately from the fuel tank in aircraft in which a decrease in weight is strongly demanded.

The present invention has been accomplished in view of such circumstances, and an object of the present invention is to provide a fuel tank, a fuel pipe, and an aircraft capable of ensuring fuel supply even when water contained in fuel freezes.

SUMMARY OF THE INVENTION

The present invention provides a fuel tank that stores fuel to be fed to a fuel supply destination through a pipe, wherein a whole or a portion of a storage fuel contact portion in contact with the fuel within the fuel tank is subjected to surface finishing for imparting hydrophilicity.

The storage fuel contact portion means an inner wall of the fuel tank or a surface of a member arranged within the fuel tank.

Here, examples of the surface finishing for imparting hydrophilicity include coating with a material having hydrophilicity, and surface processing for imparting a form having hydrophilicity to a surface of the storage fuel contact portion. The surface finishing for imparting hydrophilicity also includes attachment of a film or the like formed of a material having hydrophilicity to a surface of the storage fuel contact portion.

In accordance with the present invention, water contained in the fuel in contact with the storage fuel contact portion within the fuel tank can be solidified and held on the storage fuel contact portion. Accordingly, the concentration of moisture in the fuel flowing into a fuel pipe from the fuel tank is lowered, and adhesion of ice to an inner wall of the fuel pipe is inhibited. Supply of the fuel through the fuel pipe can be thereby ensured.

Even if a small amount of ice adheres to the inner wall of the fuel pipe and falls away from the inner wall due to fuel pulsation or the like, the ice is only in the form of grains or small lumps. Thus, a fuel supply path including the fuel pipe and a port of the fuel supply destination is not blocked.

As described above, the supply of the fuel to the fuel supply destination can be ensured even when the water contained in the fuel freezes.

Moreover, in accordance with the present invention, frequent maintenance, which is required when a filtering device is used, and a transfer tank, which is required when a carbon-based material is used, are not required.

In the present invention, it is preferable that a plurality of fuel tanks are provided as the fuel tank, and a transfer mechanism that transfers the fuel from one of the plurality of fuel tanks to another of the plurality of fuel tanks is provided.

When the transfer mechanism is provided, motion is applied to the fuel stored in each of the fuel tanks. Therefore, the fuel in contact with the storage fuel contact portion within each of the fuel tanks is efficiently replaced, so that the moisture in most of the fuel can be collected on the storage fuel contact portion, and adhesion of ice to the storage fuel contact portion can be promoted.

A drain port through which water separated from the fuel is discharged is preferably provided so as to be openable and closable in a bottom portion of the fuel tank of the present invention.

When the ice in the fuel tank is melted, the resulting water flows down along the inner wall of the fuel tank or the like by its own weight, and reaches the bottom portion of the fuel tank.

Therefore, the water accumulated on the bottom portion can be discharged from the drain port by opening the drain port.

The fuel tank of the present invention preferably includes a single or a plurality of barriers that partition a bottom portion of the fuel tank into a first region and a second region, wherein an introduction portion that introduces the fuel in the fuel tank into the pipe is preferably located in one of the first region and the second region.

Since water settling to the bottom portion of the fuel tank based on a density difference between the water and the fuel is held back by the barrier, it is possible to prevent the water from being sucked into the fuel pipe from the introduction portion together with the fuel by the motion of the fuel in the fuel tank.

Also, the barrier is preferably subjected to surface finishing for imparting hydrophilicity. Accordingly, ice can be sufficiently caused to adhere to a surface of the barrier and be held thereon under a temperature environment lower than a solidifying point of water, and the moisture concentration of the fuel in the fuel tank can be thereby reduced.

Regarding the fuel tank including the barrier, it is not always required that the whole or a portion of the member in contact with the fuel within the fuel tank is subjected to the surface finishing for imparting hydrophilicity.

That is, a second fuel tank of the present invention is a fuel tank that stores fuel to be fed to a fuel supply destination through a pipe, the fuel tank including a single or a plurality of barriers that partition a bottom portion of the fuel tank into a first region and a second region, wherein an introduction portion that introduces the fuel in the fuel tank into the pipe is located in one of the first region and the second region.

The present invention provides a fuel pipe through which fuel to be fed to a fuel supply destination from a tank that stores the fuel flows, wherein a whole or a portion of an inner wall of the fuel pipe is made of a material having water repellency, or is subjected to surface finishing for imparting water repellency.

Here, examples of the surface finishing for imparting water repellency include coating with a material having water repellency, and surface processing for imparting a form having water repellency to an inner wall surface of the fuel pipe. The surface finishing for imparting water repellency also includes attachment of a film or the like formed of a material having water repellency to an inner wall surface of the fuel pipe.

In accordance with the present invention, even when water contained in the fuel flowing through the fuel pipe solidifies, the resulting ice hardly adheres to the inner wall of the fuel pipe since the inner wall of the fuel pipe has water repellency. Supply of the fuel through the fuel pipe can be thereby ensured.

Even if a small amount of ice adheres to the inner wall of the fuel pipe and falls away from the inner wall due to fuel pulsation or the like, the ice is only in the form of grains or small lumps. Thus, a fuel supply path including the fuel pipe and a port of the fuel supply destination is not blocked.

As described above, the supply of the fuel to the fuel supply destination can be ensured even when the water contained in the fuel freezes.

Moreover, in accordance with the present invention, frequent maintenance, which is required when a filtering device is used, and a transfer tank, which is required when a carbon-based material is used, are not required.

Here, in view of preventing adhesion of ice to the inner wall of the fuel pipe, it is also effective to give coating or surface processing for imparting hydrophobicity to the inner wall of the fuel pipe. A point described as water repellency in the present specification can be also replaced with hydrophobicity. In this sense, the "water repellency" in the present invention also includes hydrophobicity.

The fuel pipe of the present invention may be provided with a water separator that receives and circulates a flow of the fuel.

A centrifugal force acts on the fuel swirling in the water separator, so that the fuel and the water having different specific gravities are centrifugally separated. The water separated from the fuel and solidifying in a subfreezing temperature environment is retained on an inner wall of the water separator as ice, and the fuel from which the moisture is separated can be returned to the fuel pipe.

When the moisture is held on the inner wall of the water separator, the moisture concentration of the fuel passing through the water separator becomes lower than that before passing through the water separator. Thus, it is possible to inhibit adhesion of ice to the inside of the fuel pipe, and prevent blocking of the fuel pipe.

An inner wall of the water separator is preferably subjected to surface finishing for imparting hydrophilicity.

The fuel pipe of the present invention preferably has a curved section, and a vessel that opens toward an upstream side of a flow of the fuel in the fuel pipe is preferably arranged on an outer peripheral side of the section in the fuel pipe.

Accordingly, moisture is separated from the fuel by a centrifugal force acting on the fuel flowing through the curved section, and the moisture is captured by the vessel located on the outer peripheral side of the section. Therefore, the moisture concentration of the fuel flowing to a downstream side of the vessel can be lowered, and it is possible to avoid blocking of a flow path for the fuel by a lump of ice.

When a hole or a slit through which the fuel passes is formed in the vessel, a pressure loss of the fuel can be decreased.

Regarding the fuel pipe in which the vessel is installed, it is not always required that the inner wall of the fuel pipe is subjected to the surface finishing for imparting water repellency.

That is, a second fuel pipe of the present invention is a fuel pipe through which fuel to be fed to a fuel supply destination from a tank that stores the fuel flows, wherein the fuel pipe has a curved section, and a vessel that opens toward an upstream side of a flow of the fuel in the fuel pipe is arranged on an outer peripheral side of the section in the fuel pipe.

A fuel supply apparatus of the present invention includes the above fuel tank and the above fuel pipe.

An aircraft of the present invention includes the above fuel supply apparatus, and an engine as the fuel supply destination.

When treatment for setting water wettability of the fuel tank or the fuel pipe is performed as described above, it is not necessary to provide a filtering device and a transfer tank. Thus, a demand for a decrease in the weight of aircraft can be satisfied.

In the aircraft of the present invention, a portion of a cooling oil path through which cooling oil used in the engine flows may be arranged so as to enable heat dissipation to the fuel pipe or a member provided in the fuel pipe and through which the fuel passes.

The "member through which the fuel passes" includes the water separator and the vessel described above.

The "cooling oil" includes engine oil and gear cooling oil or the like.

Since heat is dissipated to the fuel pipe or the member through which the fuel passes from a portion of the cooling oil path, it is possible to prevent freezing of moisture contained in the fuel, and melt an ice grain in a fuel path. Accordingly, supply of the fuel to the engine can be ensured.

An aircraft of the present invention includes a fuel pipe through which fuel to be fed to a fuel supply destination from a tank that stores the fuel flows, and an engine as the fuel supply destination, wherein a portion of a cooling oil path through which cooling oil used in the engine flows is arranged so as to enable heat dissipation to the fuel pipe or a member provided in the fuel pipe and through which the fuel passes.

In accordance with the present invention, the fuel pipe or the member provided in the fuel pipe and through which the fuel passes is heated by the cooling oil, so that it is possible to inhibit freezing of the fuel supplied to the engine.

A method for supplying fuel of the present invention includes the steps of, in a fuel tank that stores fuel in a temperature environment lower than a freezing point of the water, causing moisture contained in the fuel in contact with a hydrophilic inner wall of the fuel tank, or a hydrophilic member located in the fuel tank, to solidify and adhere to the inner wall or the member, to thereby separate the moisture from the fuel, and supplying the fuel in the fuel tank to a supply destination through a pipe.

In accordance with the present invention, the supply of the fuel can be ensured even when the water contained in the fuel freezes.

BRIEF DESCRIPTION OF THE DRAWINGS

FIG. 5 is a view illustrating a fuel supply apparatus according to a fifth embodiment of the present invention;

FIG. 8 is a schematic view for explaining heat dissipation from an engine oil pipe to the fuel pipe or the like.

DETAILED DESCRIPTION OF THE PREFERRED EMBODIMENTS

In the following, embodiments of the present invention are described by reference to the accompanying drawings.

First Embodiment

Figure 1:
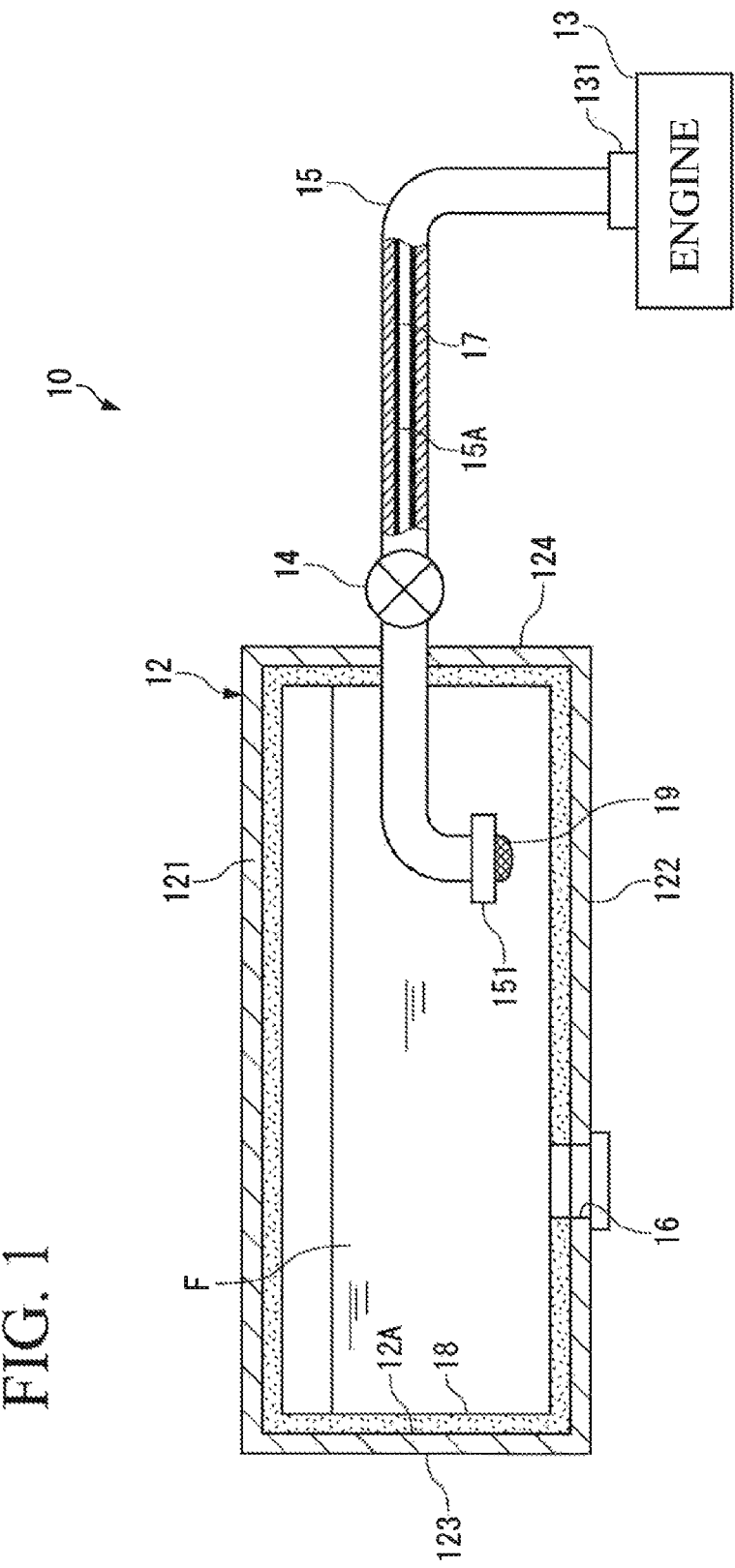
FIG. 1 is a view illustrating a fuel supply apparatus according to a first embodiment of the present invention.

A fuel supply apparatus 10 shown in FIG. 1 is mounted on an aircraft, and supplies fuel F to an engine 13 that is supported by a main wing of the aircraft.

The fuel supply apparatus 10 includes a fuel tank 12 that stores the fuel F, a fuel pump 14 that feeds out the fuel F (jet fuel) in the fuel tank 12 toward the engine 13, and a fuel pipe 15 that is interposed between the fuel tank 12 and the engine 13.

The fuel supply apparatus 10 is schematically shown in the respective drawings.

The main wing of the aircraft is formed in a box shape, and also functions as the fuel tank 12.

The fuel F in a predetermined amount corresponding to a flight distance, the number of passengers and the like is supplied to an inner portion of the fuel tank 12 (an inner portion of the main wing) from a fuel filler opening (not shown).

A ventilation path (not shown) communicating with outside air is provided in the fuel tank 12. A balance between an outside air pressure and a tank internal pressure is achieved by ventilation performed via the ventilation path.

The fuel F contains moisture derived from moisture in the air, rain or the like. The moisture contained in the fuel F may be water (including supercooled water), or may be ice. Water and ice coexist in some cases. In the present specification, water and ice are sometimes inclusively referred to as "moisture".

The concentration of the moisture contained in the fuel F is, for example, about 100 ppm to 500 ppm.

When the fuel F contains the moisture, combustion efficiency is lowered, and the water in the fuel F solidifies in a very low temperature environment in the sky to adhere to an inner wall of the fuel pipe 15 as ice. Thus, the fuel F becomes difficult to flow. The fuel supply apparatus 10 of the present embodiment prevents the supply of the fuel F from being disturbed by freezing in the fuel pipe 15.

An upper wall 121 of the fuel tank 12 is composed of a skin on an upper surface side of the main wing. A lower wall 122 (a bottom portion) of the fuel tank 12 is composed of a skin on a lower surface side of the main wing. The upper wall 121 is supported at an upper end of a rib (not shown), and the lower wall 122 is supported at a lower end of the rib. A plurality of stringers (not shown) are provided on an inner surface of the skin constituting the upper wall 121 and the lower wall 122.

A side wall 123 on the front side of the fuel tank 12 is composed of a spar on the leading edge side of the main wing. A side wall 124 on the rear side of the fuel tank 12 is composed of a spar on the trailing edge side of the main wing.

The skin, the rib, the stringer, and the spar constituting the main wing are formed of a metal material, fiber reinforced plastics (FRP), or the like.

Aluminum alloy, iron alloy such as stainless steel, or the like can be used as the metal material.

A drain port 16 through which water separated from the fuel F is discharged is provided in the lower wall 122 of the fuel tank 12. A lid, a valve or the like for opening and closing the drain port 16 is provided in the drain port 16.

The fuel pump 14 pressure-feeds the fuel F to the engine 13 through the fuel pipe 15 at a flow rate sufficient for a maximum fuel consumption rate of the engine 13. The fuel F pressure-fed by the fuel pump 14 is partially returned to the fuel tank 12 through a pipe (not shown) according to the fuel consumption amount of the engine 13.

The fuel pipe 15 forms a fuel supply path for supplying the fuel F from the fuel tank 12 to the engine 13. One end of the fuel pipe 15 is pulled into the fuel tank 12, and is provided with an introduction portion 151 that introduces the fuel F stored in the fuel tank 12 into the fuel pipe 15.

The introduction portion 151 is arranged slightly upwardly apart from the lower wall 122 so as to avoid the inflow of foreign matter or moisture accumulated on the lower wall 122 of the fuel tank 12.

The introduction portion 151 is also covered with a mesh-like cover 19.

It is preferable to provide two or more extraction ports as the introduction portion 151 of the fuel pipe 15 so as to provide redundancy.

The fuel pipe 15 is arranged along the lower wall 122 up to the engine 13. The other end of the fuel pipe 15 is connected to a fuel receiving port 131 formed in the engine 13.

The fuel pipe 15 from the one end to the other end is composed of a plurality of pipes, joints, valves or the like. As a pipe constituting the fuel pipe 15, a stringer may be used in addition to a normal pipe formed of metal, resin or the like. To be more specific, stringers adjacent to each other can be caused to function as a pipe by partitioning a space located between the stringers from a storage space within the fuel tank 12.

A bypass pipe is connected to the fuel pipe 15 so as to provide redundancy. The bypass pipe is connected to the fuel receiving port 131 of the engine 13.

The fuel supply apparatus 10 mainly employs the following two configurations in order to prevent the supply of the fuel F from being disturbed by freezing in the fuel pipe 15.

First, an inner wall 15A of the fuel pipe 15 has water repellency.

Second, an inner wall of the fuel tank 12 has hydrophilicity.

First, the first configuration is described.

The first configuration is targeted at the fuel pipe 15. Since water or ice hardly adheres to the inner wall of the fuel pipe 15 having water repellency, the fuel pipe 15 can be prevented from being narrowed due to deposition of ice.

In the present embodiment, a base on the inner side of the fuel pipe 15, that is, a base material formed of metal, resin or the like is subjected to coating with a material having water repellency, or is subjected to surface processing for imparting water repellency.

Although it is ideal to apply water-repellent coating/surface processing 17 to the entire inner wall of the fuel pipe 15, it is also allowed to partially apply the water-repellent coating/surface processing 17. It is preferable to apply the water-repellent coating/surface processing 17 at least to a position where a flow path within the pipe is easily blocked by freezing.

As the water-repellent coating, for example, a fluorine-based resin material may be used as the base material (regardless of water repellency and hydrophilicity) of the fuel pipe 15, and coating may be applied by using a fluorine-based resin material such as PTFE (polytetrafluoroethylene) and PFA (a copolymer of tetrafluoroethylene and perfluoroalkylvinylether). Water repellency with a contact angle on a smooth surface of, for example, 100° or more can be achieved by the chemical property of a coat obtained by the water-repellent coating as described above.

The contact angle also depends on a fine form of a surface.

The influence of surface roughness on the contact angle is described.

A true contact angle is represented by $\theta$, an apparent contact angle is represented by $\varphi$, and surface roughness (roughness factor) derived from an actual surface area/an apparent area is represented by r. In this case, in a case of the true contact angle $\theta<90°$, $\varphi<\theta$, which means that the surface is more wettable as the surface roughness is larger, and in a case of the true contact angle $\theta>90°$, $\varphi>\theta$, which means that the surface is less wettable as the surface roughness is larger, based on $\cos \varphi = r \cos \theta$ (Wenzel equation).

That is, the surface roughness acts to emphasize the contact angle according to the chemical property of the surface.

Therefore, the contact angle becomes larger, and the water repellency is improved by performing surface processing for forming a rough surface, such as filing, sand blasting, application of or exposure to a corrosive fluid, and etching, on the fuel pipe 15 made of a base material having a contact angle on a smooth surface exceeding 90°.

Also, as the water-repellent surface processing, for example, etching using plasma may be performed to form a fractal surface by use of self-organization accompanying crystal growth. In a case of a material having a contact angle on a smooth surface exceeding 90°, ultra-water repellency with a very large contact angle can be obtained by forming a fractal surface (or a pseudo fractal surface).

The surface processing for forming a rough surface or a fractal surface can be performed alone without performing the above water-repellent coating.

When both of the water-repellent coating and the above surface processing are employed, the water repellency can be further improved because of the synergistic action.

For example, the water-repellent coating can be applied after performing the above surface processing on the base material of the fuel pipe 15.

By performing the water-repellent coating or the surface processing described above alone, or both of the water-repellent coating and the surface processing, the water repellency with a contact angle of, for example, 100° or more can be achieved. The contact angle is preferably 120° or more.

In the present embodiment, it is also allowed that the fuel pipe 15 is formed of a resin material (for example, a fluorine-based resin) having water repellency, and the inner wall 15A of the fuel pipe 15 is not subjected to the coating or the surface processing.

Next, the second configuration is described.

The second configuration is targeted at an inner wall 12A of the fuel tank 12. A base on the inner side of the fuel tank 12, that is, a base material formed of a metal material or the like is subjected to coating with a material having hydrophilicity, or is subjected to surface processing for imparting hydrophilicity. Water in contact with the inner wall of the fuel tank 12 having hydrophilicity is frozen and held as it is in a low temperature environment below the freezing point. The moisture is thereby separated from the fuel F. Accordingly, the concentration of the moisture in the fuel F is lowered, and adhesion of ice to the inside of the fuel pipe 15 is inhibited.

It is preferable to apply hydrophilic coating/surface processing 18 at least to a portion located below the liquid level of the fuel F and thus in contact with the fuel F when an airframe is in a horizontal attitude during cruising in the sky or the like.

The position and the range of the liquid level of the fuel F vary depending on a change in the attitude of the airframe. Thus, the entire inner wall of the fuel tank 12 except for a portion not in contact with the fuel F within a range of attitudes possibly assumed during a normal flight has a chance to come into contact with the fuel F. If the inner wall is in a subfreezing temperature environment when coming into contact with the fuel F, the water in the fuel F could freeze. Thus, it is preferable to apply the hydrophilic coating/surface processing 18 to the entire inner wall of the fuel tank 12 having a chance to come into contact with the fuel F.

The inner wall of the fuel tank 12 is composed of the skin, and the stringer and the spar provided on the inner surface of the skin. The hydrophilic coating/surface processing 18 is applied to their surfaces.

It is also preferable to similarly apply the coating/surface processing 18 to surfaces of a plurality of ribs located in the fuel tank 12, and a surface of a member arranged in the fuel tank 12.

As the hydrophilic coating, for example, aluminum alloy, stainless steel or the like may be used as the base material (a material of a structural member of the main wing, such as the skin and the spar) of the fuel tank 12, and coating may be applied by using silica (silicon dioxide) or the like. Aluminum alloy and stainless steel have a contact angle less than 90°, and have hydrophilicity. Hydrophilicity with a contact angle on a smooth surface of, for example, 40° or less can be achieved by the chemical property of a coat obtained by the hydrophilic coating as described above.

As described above, the surface roughness acts to emphasize the contact angle according to the chemical property of the surface.

Therefore, the contact angle becomes smaller, and the hydrophilicity is improved by performing surface processing for forming a rough surface, such as filing, sand blasting, application of or exposure to a corrosive fluid, and etching, on the fuel tank 12 made of a base material having a contact angle on a smooth surface less than 90°.

The surface processing for forming a rough surface can be performed alone without performing the above hydrophilic coating.

When both of the hydrophilic coating and the above surface processing are employed, the hydrophilicity can be further improved because of the synergistic action.

For example, the hydrophilic coating can be applied after performing the above surface processing on the base material of the fuel tank 12.

By performing the hydrophilic coating or the surface processing described above alone, or both of the hydrophilic coating and the surface processing, the hydrophilicity with a contact angle of, for example, 40° or less can be achieved. The contact angle is preferably 20° or less.

The operation of the fuel supply apparatus 10 is described.

The temperature of outside air around the aircraft decreases along with an increase in altitude after the aircraft takes off. For example, when the aircraft reaches an altitude of about 10000 feet, the airframe is exposed to outside air having a low temperature of, for example, about −40° C. The wall (the main wing) of the fuel tank 12 constituting an outer surface of the airframe is directly cooled by the outside air.

Here, since the inner wall of the fuel tank 12 has the hydrophilicity, minute particles of water dispersed in the fuel F come into contact with the inner wall of the fuel tank 12 with a large contact area. If the water is cooled to the freezing point or less by the fuel tank 12, the water solidifies and adheres to the inner wall of the fuel tank 12. When a crystal nucleus of ice is formed on the inner wall, the crystal gradually grows up to be deposited on the inner wall of the fuel tank 12 as the water in the fuel F solidifies or as the crystal unites with a crystal adjacent thereto or ice in the fuel F.

When the water contained in the fuel F is supercooled water having great intrinsic energy, the water releases energy at once upon receiving external action such as vibration of the airframe due to airstream and vibration generated by the fuel pump 14. Accordingly, icing occurs in a wide range of the inner wall with which the fuel F is in contact before the crystals sufficiently grow up. Since vibration is continuously applied to the fuel tank 12, icing repeatedly occurs due to solidification of the supercooled water.

Since the hydrophilic coating/surface processing 18 is applied, an adhesion force between the inner wall of the fuel tank 12 and the ice is increased. Thus, the ice is held on the inner wall of the fuel tank 12 without falling away even upon receiving an external force such as vibration.

Since there is a temperature difference in the fuel F within the fuel tank 12 between a portion close to a wall surface of the fuel tank 12 that is directly exposed to the low-temperature outside air, and a portion far from the wall surface, convection occurs based on a density difference. The fuel F in contact with the wall surface of the fuel tank 12 is replaced by the convection, so that the moisture in the fuel F within the fuel tank 12 can be collected on the wall surface, and the ice can be deposited on the wall surface.

Here, if a device that forcibly moves the fuel F within the fuel tank 12 is provided, the fuel F in contact with the wall surface can be efficiently replaced. When the device causes the flow of the fuel F to strike the wall surface, most of the stored fuel F can be surely brought into contact with the wall surface, and the moisture can be thereby solidified.

The moisture in the fuel F stored in the fuel tank 12 is separated from the fuel F by the solidification on the inner wall 12A of the fuel tank 12, and is held as ice on the inner wall 12A as described above. Thus, the concentration of the moisture in the fuel F flowing into the fuel pipe 15 from the introduction portion 151 becomes lower than that of the original fuel F within the fuel tank 12.

However, the entire fuel supply apparatus 10 is cooled below the freezing point by the low-temperature outside air in the sky. Thus, the moisture in the fuel F could also freeze in the fuel pipe 15 although the amount is small.

Here, the moisture in the fuel F comes into contact with the inner wall 15A of the fuel pipe 15 only with a small area since the inner wall 15A has the water repellency. Since the moisture in contact with the inner wall 15A is swept away by the flow of the fuel F within the fuel pipe 15, the ice hardly adheres to the inner wall of the fuel pipe 15. Therefore, even when the moisture freezes in the fuel pipe 15, the fuel F flows in a state in which the ice is dispersed, and is supplied to the engine 13. The ice is dispersed in the fuel F without forming a lump. Moreover, since the fuel F flowing through the fuel pipe 15 is heated by heat dissipated from the engine 13, the ice dispersed in the fuel F is melted.

Therefore, the fuel supply path from the fuel pipe 15 to the fuel receiving port 131 of the engine 13 is not blocked by the ice.

The outside air temperature around the aircraft increases along with a decrease in the altitude of the aircraft from the sky. When the outside air temperature exceeds the solidifying point, i.e., the freezing point of the water, the ice adhering to the inner wall 12A of the fuel tank 12 is melted. The resulting water then flows down along the inner wall 12A by its own weight, and reaches the bottom portion of the fuel tank 12. The ice adhering to the inner wall 12A also falls away, and drops to the bottom portion of the fuel tank 12. When the airframe is in a nose down attitude, a portion of the side wall 123 on the leading edge side is also included in the bottom portion of the fuel tank 12.

Even when the dropped ice is accumulated on the bottom portion of the fuel tank 12, the ice can be prevented from being sucked into the fuel pipe 15 from the introduction portion 151 by the mesh-like cover 19.

Even if a thin layer of ice adheres to the inner wall 15A of the fuel pipe 15, the ice melted to fall away from the inner wall 15A is only in the form of grains or small lumps at most. Thus, the fuel supply path is not blocked. The same applies to a case in which the ice falls away from the inner wall 15A due to a variation in the pressure of the fuel F by thrust adjustment before landing, or vibration applied to the fuel pipe 15.

After landing, the moisture accumulated on the bottom portion of the fuel tank 12 is discharged from the drain port 16 of the lower wall 122 by opening the drain port 16. When the engine 13 is stopped after landing, the fuel F remaining in the fuel tank 12 is put in a stationary state with no motion. Therefore, the moisture contained in the fuel F sufficiently settles to the bottom portion of the fuel tank 12 based on a density difference between the fuel F and the moisture. The settled moisture can be also discharged from the drain port 16.

Here, when the lower wall 122 has a down grade toward the drain port 16, the water flowing down along the wall smoothly flows to the drain port 16, and can be thereby more surely discharged.

It is also effective to provide a plurality of drain ports 16.

In accordance with the present embodiment, the moisture contained in the fuel F is removed by imparting the hydrophilicity (the coating/surface processing 18) to the inner wall 12A of the fuel tank 12, and thereby actively causing the ice to adhere to the inner wall 12A as described above. Thus, icing is difficult to occur in the fuel pipe 15.

Moreover, the water repellency (the coating/surface processing 17) is imparted to the inner wall 15A of the fuel pipe 15. Thus, even when the remaining moisture in the fuel F solidifies, the resulting ice hardly adheres to the inner wall 15A.

Consequently, the inner portion of the fuel pipe 15 is not narrowed by the ice, and the fuel F flows therein at a sufficient flow rate.

Even if a thin layer of ice adheres to the inner wall 15A of the fuel pipe 15, and the ice is swept away by the flow of the fuel F to fall away from the inner wall 15A when thrust is increased or the like, the ice is only in the form of grains or small lumps. Thus, the fuel supply path is not blocked.

Therefore, the supply of the fuel F to the engine 13 can be ensured.

Second Embodiment

Figure 2:
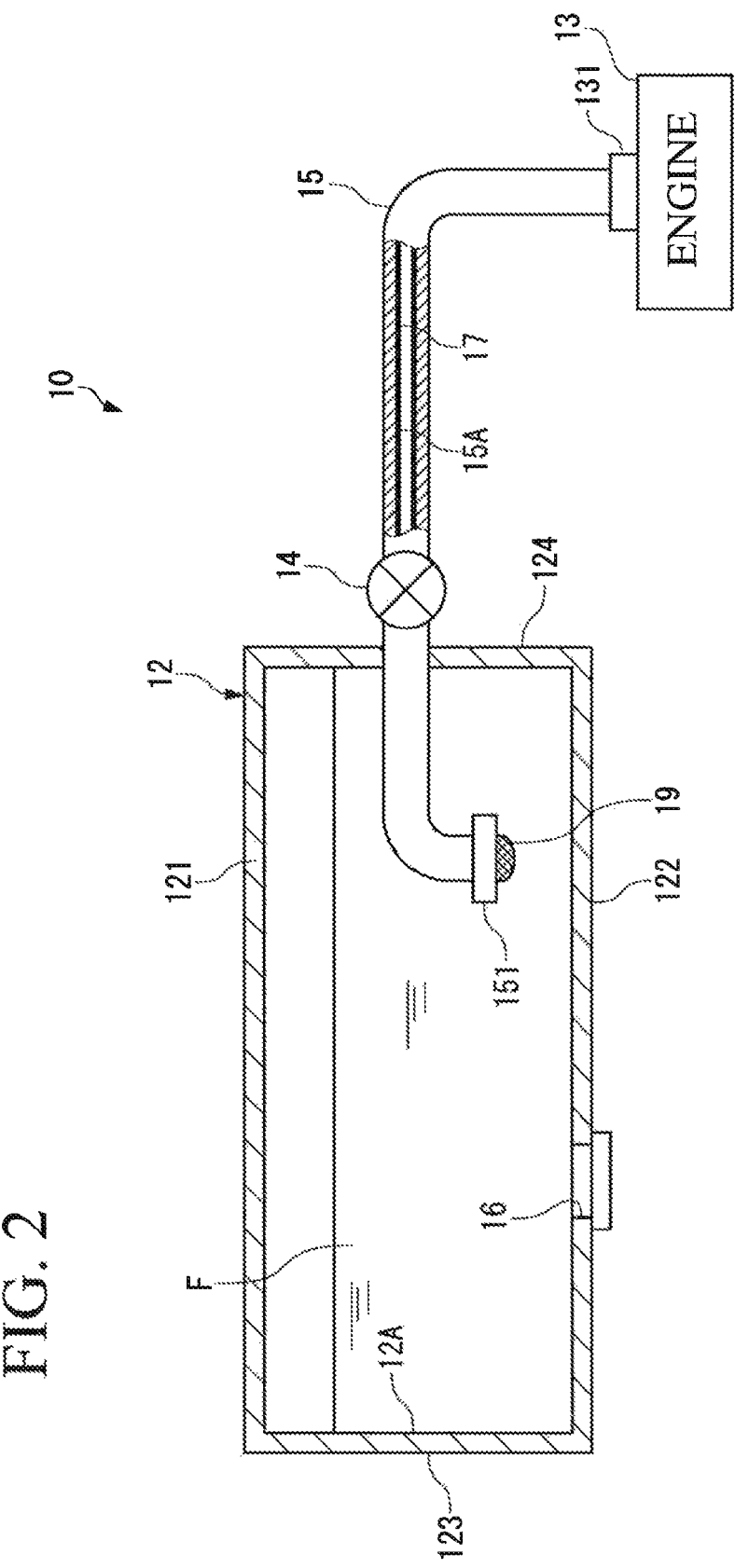
FIG. 2 is a view illustrating a fuel supply apparatus according to a second embodiment of the present invention.

Next, a second embodiment of the present invention is described by reference to FIG. 2.

In the following, the same components as those of the configuration described in the first embodiment are assigned the same reference numerals, and the description is omitted or simplified.

In the second embodiment, the water repellency is imparted to the inner wall 15A of the fuel pipe 15 by the coating or the surface processing (the coating/surface processing 17) similarly to the first embodiment.

On the other hand, the inner wall 12A of the fuel tank 12 is not subjected to the coating or the surface processing for imparting the hydrophilicity. The fuel tank 12 is formed of a metal material such as aluminum alloy and stainless steel, and the base material of the fuel tank 12 has hydrophilicity (a contact angle less than 90°).

In the present embodiment, blocking of the fuel pipe 15 by icing is mainly prevented by the inner wall 15A of the fuel pipe 15 having the water repellency.

The moisture in the fuel F comes into contact with the water-repellent inner wall 15A of the fuel pipe 15 only with a small area. Moreover, the flow of the fuel F collides with the ice. Thus, the ice hardly adheres to the inner wall of the fuel pipe 15.

Consequently, the inner portion of the fuel pipe 15 is not narrowed by the ice, and the fuel F flows therein at a sufficient flow rate, so that the supply of the fuel F to the engine 13 can be ensured.

The present embodiment has the same configuration as the first embodiment except that the hydrophilicity of the inner wall 12A of the fuel tank 12 is not strengthened. The description of the effects obtained by the same configuration as the first embodiment are omitted here.

By the way, the contact angle of the base material of the fuel tank 12 is larger than the contact angle obtained by the hydrophilic coating or surface processing. Thus, a contact area between the inner wall 12A and the water is not as large as that in the first embodiment. However, the water in the fuel F in contact with the inner wall 12A of the fuel tank 12 that is put under a subfreezing temperature environment solidifies and adheres to the inner wall 12A as ice. Although the amount of the adhering ice is smaller than that in the first embodiment, the ice is held on the inner wall 12A until melted. Thus, the concentration of the moisture contained in the fuel F flowing into the fuel pipe 15 from the fuel tank 12 can be kept low. Accordingly, the blocking of the fuel pipe 15 can be also prevented.

Here, in the present invention, it is allowed that the inner wall 12A of the fuel tank 12 has water repellency without having the hydrophilicity. Even when no ice adheres to the water-repellent inner wall 12A of the fuel tank 12, and the moisture concentration of the fuel F within the fuel tank 12 is thus not lowered, the inner wall 15A of the fuel pipe 15 has the water repellency. Thus, the blocking of the fuel pipe 15 by icing can be prevented, and the supply of the fuel F can be ensured.

Third Embodiment

Figure 3:
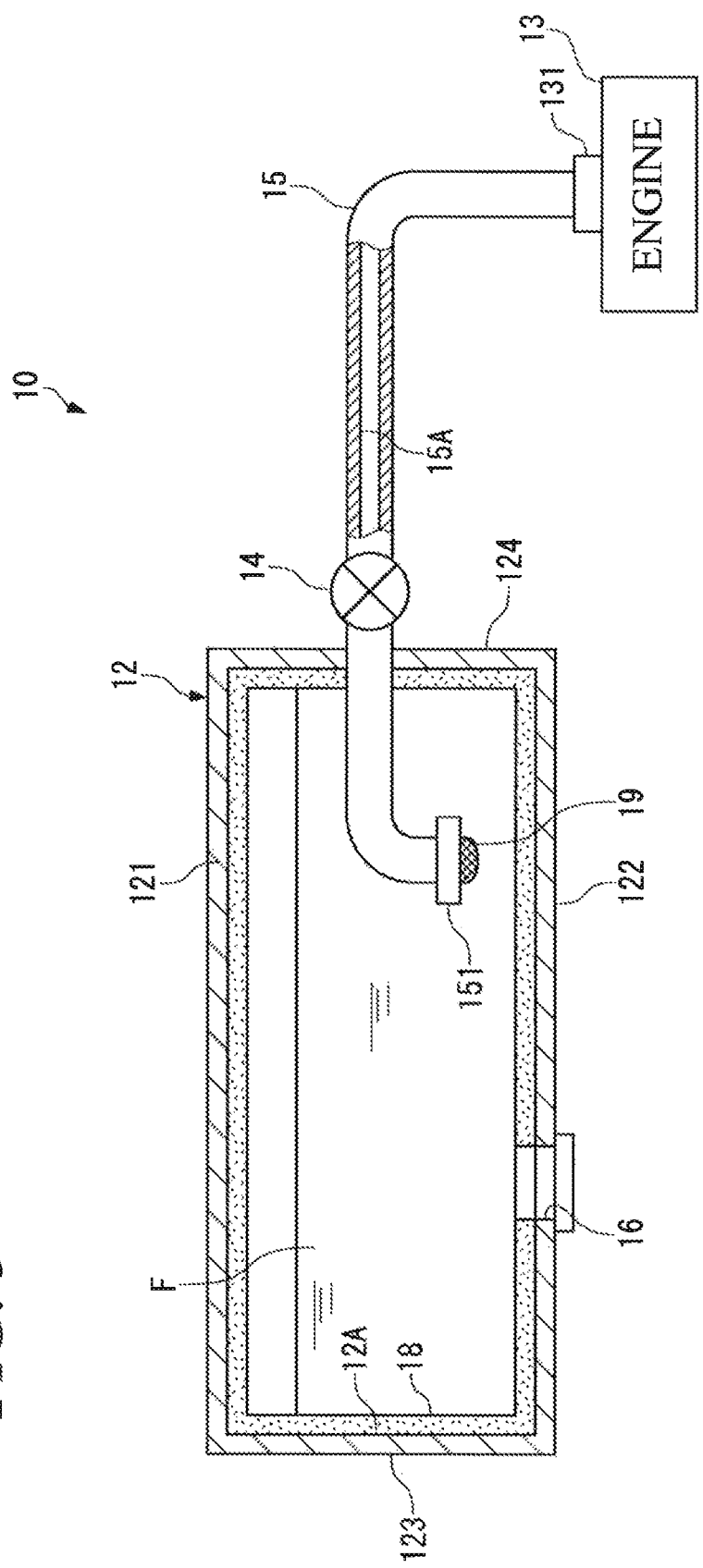
FIG. 3 is a view illustrating a fuel supply apparatus according to a third embodiment of the present invention.

Next, a third embodiment of the present invention is described by reference to FIG. 3.

In the third embodiment, the hydrophilicity is imparted to the inner wall 12A of the fuel tank 12 by the coating or the surface processing (the coating/surface processing 18) similarly to the first embodiment.

On the other hand, the inner wall 15A of the fuel pipe 15 is not subjected to the coating or the surface processing for imparting the water repellency. The fuel pipe 15 is formed of metal or resin, and has water wettability according to the material.

It is preferable that the fuel pipe 15 is formed of a water-repellent material such as a fluorine-based resin material since adhesion of ice to the inner wall 15A of the fuel pipe 15 can be prevented.

However, it is also allowed that the fuel pipe 15 is formed of a hydrophilic material. This is because the hydrophilicity of the inner wall 12A of the fuel tank 12 is strengthened by the coating/surface processing 18, so that the concentration of the moisture in the fuel F flowing into the fuel pipe 15 can be suppressed by accumulating the moisture contained in the stored fuel F on the inner wall 12A of the fuel tank 12. Accordingly, the amount of the ice adhering to the inner wall 15A of the fuel pipe 15 can be kept small, so that blocking of the fuel pipe 15 can be prevented.

Here, heat transferred to the fuel pipe 15 from the engine 13, vibration transferred to the fuel pipe 15 from the airframe, the flow of the fuel F through the fuel pipe 15 or the like also contribute to inhibiting the adhesion of the ice to the inner wall 15A of the fuel pipe 15.

The present embodiment has the same configuration as the first embodiment except that the inner wall 15A of the fuel pipe 15 is not subjected to the coating or the surface processing for imparting the water repellency. The description of the effects obtained by the same configuration as the first embodiment are omitted here.

Fourth Embodiment

Figure 4A:
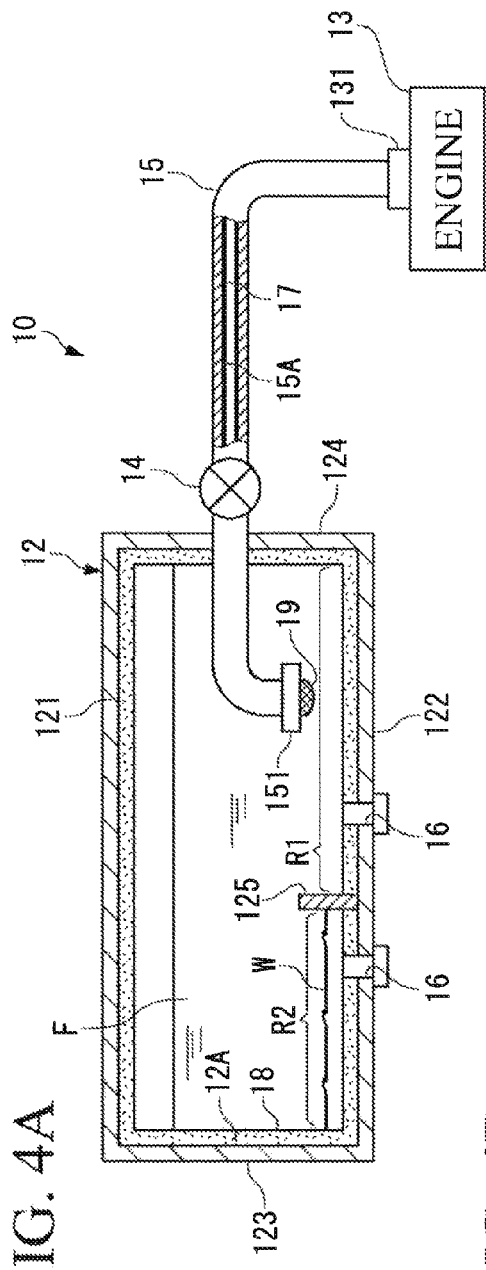
FIGS. 4A and 4B are views illustrating a fuel supply apparatus according to a fourth embodiment of the present invention.

Next, a fourth embodiment of the present invention is described by reference to FIG. 4A.

While the moisture contained in the fuel F within the fuel tank 12 solidifies on the inner wall 12A, the moisture is separated from the fuel F and settles to the bottom portion of the fuel tank 12 based on a density difference.

When the fuel F is pressure-fed to the engine 13 through the fuel pipe 15 by the fuel pump 14, motion of the fuel F toward the introduction portion 151 of the fuel pipe 15 is generated in the fuel tank 12.

In the fourth embodiment, in order to prevent the water separated from the fuel F based on the density difference from being introduced into the fuel pipe 15 from the introduction portion 151 of the fuel pipe 15 together with the fuel F, a barrier 125 that acts on the water in the fuel tank 12 is provided on the lower wall 122 (the bottom portion) of the fuel tank 12.

The bottom portion in the fuel tank 12 is partitioned into two regions R1 and R2 by the barrier 125.

The introduction portion 151 of the fuel pipe 15 is located on the region R1 side with respect to the barrier 125.

The introduction portion 151 of the fuel pipe 15 is not located on the region R2 side with respect to the barrier 125.

The drain port 16 that is normally closed is located in each of the regions R1 and R2.

The water is separated from the fuel F based on the density difference particularly in the region R2 rather than the region R1 closer to the introduction portion 151.

While the water separated from the fuel F in the region R2 partially moves to the region R1 by the influence of the motion of the fuel F toward the introduction portion 151, the remaining water directly settles to the bottom portion in the region R2 of the fuel tank 12. Accordingly, the water is accumulated on the bottom portion in the region R2 as indicated by reference character W in FIG. 4A.

The water settling to the bottom portion in the region R2 is retained in the region R2 by the barrier 125. The barrier 125 rises from the lower wall 122 by a predetermined height. The height of the barrier 125 is preferably determined in consideration of a height where the water accumulated on the bottom portion in the region R2 cannot climb over the barrier 125 by the motion around the water, and a water level of the water W accumulated on the bottom portion in the region R2.

The barrier 125 also retains the ice falling away from the inner wall 12A of the fuel tank 12 in the region R2.

The settled moisture in the region R2 is retained in the region R2 by the barrier 125, and does not flow out to the region R1. Therefore, it is possible to prevent the settled water separated from the fuel F from being introduced into the fuel pipe 15 together with the fuel F from the introduction portion 151 facing the bottom portion within the region R1.

As the water is accumulated on the bottom portion in the region R2, the concentration of the moisture in the fuel F introduced into the fuel pipe 15 from the fuel tank 12 is lowered, so that it is also possible to inhibit the introduction of the moisture into the fuel pipe 15.

The moisture accumulated on the bottom portion in the region R2 can be discharged to outside of the fuel tank 12 from the drain port 16. The same applies to the moisture accumulated on the bottom portion in the region R1.

The shape of the barrier 125 and the shape of each of the regions R1 and R2 partitioned by the barrier 125 can be appropriately determined according to the shape of the fuel tank 12, the position of the introduction portion 151, the positions of the drain ports 16, or the like.

The barrier 125 can be formed of a metal material such as aluminum alloy. In this case, a surface of the barrier 125 exhibits hydrophilicity. Accordingly, when a temperature of the barrier 125 is lowered to the freezing point or less with low temperature outside air transferred to the barrier 125 through the skin, the water contained in the fuel F in contact with the barrier 125 solidifies on the surface of the barrier 125, and is held while adhering to the barrier 125. The moisture concentration of the fuel F stored in the fuel tank 12 is lowered by the amount of the water adhering to the barrier 125, so that it is also possible to inhibit the introduction of the moisture into the fuel pipe 15.

Moreover, when surface finishing for imparting hydrophilicity is applied to strengthen the hydrophilicity of the barrier 125, the moisture can be more sufficiently caused to adhere to the surface of the barrier 125 and be held thereon. It is thus possible to improve the effect of inhibiting the introduction of the moisture into the fuel pipe 15.

As the surface finishing applied to the barrier 125, coating and surface processing similar to those applied to the inner wall 12A of the fuel tank 12 in the first embodiment can be employed.

Figure 4B:
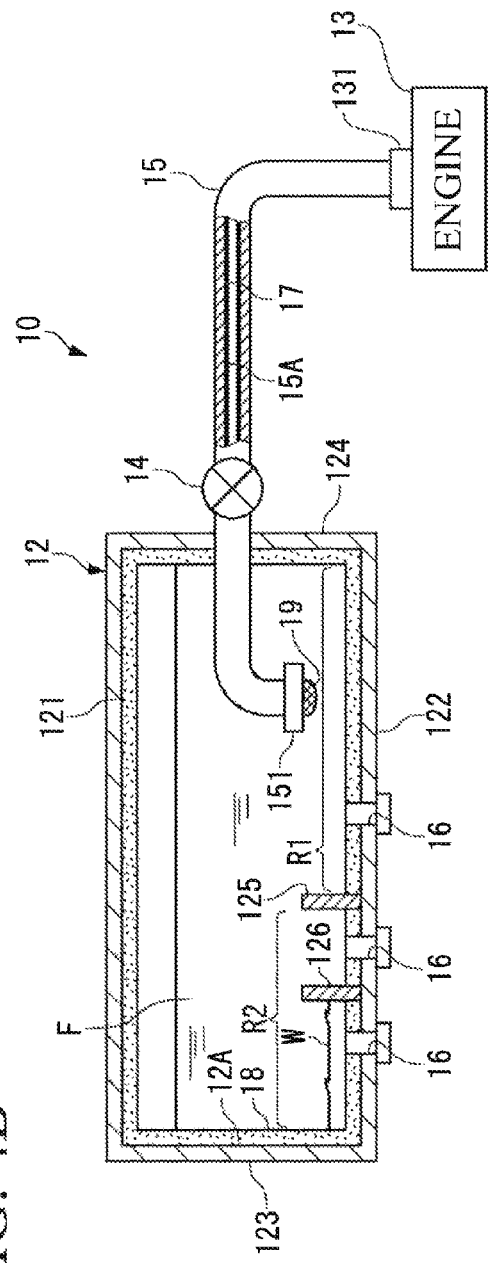

As shown in FIG. 4B, a plurality of barriers 125 and 126 may be also provided on the bottom portion of the fuel tank 12.

In this case, the region R1 where the introduction portion 151 is located and the region R2 where the introduction portion 151 is not located are partitioned by the plurality of barriers 125 and 126. Accordingly, even when the settled water climbs over one of the barriers 126 by the motion of the fuel F within the fuel tank 12, the water can be held back by the other barrier 125. It is thus possible to more reliably prevent the settled water in the region R2 from flowing out to the region R1.

The barriers 125 and 126 can be applied to any of the aforementioned first to third embodiments.

Fifth Embodiment

Next, a fifth embodiment of the present invention is described by reference to FIGS. 4A and 4B.

In the fourth embodiment, the adhesion of ice to the inner wall 12A of the fuel tank 12 is promoted by applying motion to the fuel F within the fuel tank 12. The fourth embodiment can be combined with the configuration of any of the first to third embodiments.

In the present embodiment, the inner portion of the main wing is partitioned into a plurality of fuel storage spaces. An inner tank 21 is arranged from the proximal end side of the main wing to a fuselage. An outer tank 22 is arranged on the wing tip side of the inner tank 21. The outer tank 22 is provided in each of the right and left main wings. The inner tank 21 is provided between the outer tanks 22 and 22.

The hydrophilic coating/surface processing 18 is preferably applied to an inner wall of each of the inner tank 21 and the outer tanks 22 and 22.

The fuel pump 14 that pressure-feeds the fuel F in the outer tank 22 toward the engine 13 is provided in each of the right and left outer tanks 22.

In view of efficiently supporting the fuel by lift that the main wing receives, it is preferable that more fuel F is stored in the outer tank 22 than in the inner tank 21, and the fuel F in the inner tank 21 is consumed before the fuel F in the outer tank 22.

To achieve the above configuration by simple control, a transfer pump 23 that transfers the fuel F in the inner tank 21 to the outer tank 22 and a fuel passage 24 that causes the fuel F in the outer tank 22 to overflow into the inner tank 21 are provided in the present embodiment.

The fuel F in the inner tank 21 is transferred to the outer tank 22 via a transfer pipe 25 connecting the inner tank 21 and the outer tank 22. The transfer pump 23 is connected to the transfer pipe 25.

Various pumps including an electric pump can be used as the transfer pump 23. It is particularly preferable to use a fluid pump (a jet pump). The jet pump is a fluid pump that sucks an outside fluid with a high-pressure fluid accelerated to be decompressed, and thereafter decelerates and increases the pressure of the fluid by a diffuser.

The transfer pipe 25 and the transfer pump 23 are also provided on the right side of the inner tank 21 (not shown). The fuel F in the inner tank 21 is supplied to the engine 13 by the fuel pump 14 provided in each of the outer tanks 22 and 22 of the right and left main wings as the destination of transfer.

Since the main wing has a dihedral angle, the fuel passage 24 has a down grade continuous from an inlet 241 communicating with the inside of the outer tank 22 to an outlet 242 communicating with the inside of the inner tank 21 at a lower position.

The fuel passage 24 is also provided in each of the right and left main wings.

In the present embodiment, the transfer pump 23 is operated at a capacity where the amount of the fuel F transferred from the inner tank 21 to the outer tank 22 exceeds the amount of fuel consumption by the engine 13. Accordingly, the fuel F in a larger amount than the reduced amount consumed by the engine 13 is supplied into the outer tank 22. Thus, the fuel F in the outer tank 22 is maintained in a full storage amount, and an amount exceeding the full storage amount overflows into the inner tank 21 through the fuel passage 24 by gravity.

When more fuel is consumed until the fuel F in the inner tank 21 is used up, or the fuel F cannot be pumped up by the transfer pump 23, the transfer of the fuel F is terminated. Subsequently, the fuel stops overflowing. After that, the fuel F in the outer tank 22 is consumed.

In the present embodiment, the fuel F is transferred from the inner tank 21 to the outer tank 22 by the transfer pump 23, and the fuel F is transferred from the outer tank 22 to the inner tank 21 through the fuel passage 24. Therefore, the transfer pump 23 and the fuel passage 24 respectively constitute a transfer mechanism for the fuel F.

When the transfer mechanism is provided, motion is applied to the fuel F stored in each of the tanks 21 and 22. Thus, the fuel F in contact with a wall surface of each of the tanks 21 and 22 is efficiently replaced, so that the moisture in more fuel F can be collected on the wall surface.

Furthermore, in the present embodiment, a member is provided in the vicinity of the flow of the fuel F transferred by the transfer mechanism and flowing out into the tanks 21 and 22.

To be more specific, a plate 27 is provided within the inner tank 21 below the outlet 242 of the fuel passage 24. The plate 27 may be provided below the liquid level. A plate 28 facing an outlet 252 of the transfer pipe 25 is also provided within the outer tank 22.

Therefore, when the fuel F comes into contact with the plate 27 and the plate 28 in a subfreezing temperature environment, the water in the fuel F solidifies and is deposited on a surface of each of the plates 27 and 28.

It is also preferable to apply surface finishing for imparting hydrophilicity to the surfaces of the plates 27 and 28.

In accordance with the present embodiment, motion is applied to the fuel F in the tanks 21 and 22 by using the flow of the fuel F transferred between the tanks 21 and 22 without using a device or the like for forcibly moving the fuel F, and the ice can be caused to adhere to the wall surface or the member (the plates 27 and 28) within the tanks 21 and 22 with which the fuel F is in contact.

In the present embodiment, the flow of the fuel F out of the transfer mechanism may be also directed toward the inner walls of the tanks 21 and 22 to strike the inner walls instead of providing the plates 27 and 28.

Sixth Embodiment

Next, a sixth embodiment of the present invention is described by reference to FIG. 5.

In the sixth embodiment, a swirling flow is generated in the fuel F within a vessel by using an increase in the flow velocity of the fuel F due to the existence of an extraction pipe (a narrowed portion) provided in the fuel pipe 15. The moisture is separated from the fuel F by a centrifugal force acting on the swirling flow.

The sixth embodiment can be combined with the configuration of any of the first to fifth embodiments.

A water separator 30 centrifugally separates the moisture from the fuel F by receiving the flow of the fuel F and circulating the fuel F therein.

The water separator 30 is connected to an extraction pipe 15B of the fuel pipe 15. The fuel F from which the moisture is separated by the centrifugal force acting on the swirling flow within the water separator 30 is extracted into the extraction pipe 15B.

The water separator 30 is formed in a frustum shape, and is arranged with its distal end directed downward. A water removal port 31 for removing the moisture separated from the fuel F is formed in a bottom portion (the distal end of the frustum) of the water separator 30. The water removal port 31 can be opened and closed, and is normally closed.

The water separator 30 may be also formed in a tubular shape or a conical shape.

The water separator 30 is formed of metal such as aluminum alloy and stainless steel. The water separator 30 may be also formed of resin or fiber reinforced plastics.

The water separator 30 is provided at a position directly exposed to outside air, or close to outside air in the fuel pipe 15.

An inner wall 30A of the water separator 30 is preferably subjected to hydrophilic coating or surface processing. Coating and surface processing similar to those applied to the inner wall 12A of the fuel tank 12 in the first embodiment may be employed.

Even when the hydrophilic coating or surface processing is not applied, a base material of the water separator 30 needs to have hydrophilicity.

Figure 6B:
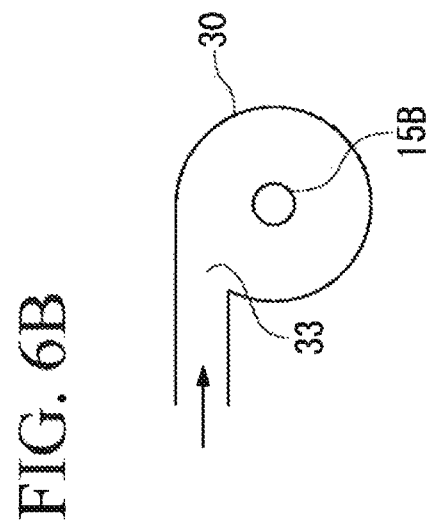
FIGS. 6A-6B are views illustrating a water separator provided in a fuel supply apparatus according to a sixth embodiment of the present invention.

An inflow port 33 through which the fuel F flows into the water separator 30 is formed in an upper wall surface of the water separator 30. The fuel F inflows through the inflow port 33 along a tangential direction of the wall surface of the water separator 30 (see FIG. 6B) and toward the bottom portion of the water separator 30. A pipe 15C of the fuel pipe 15 is connected to the inflow port 33.

Here, the pipe 15C and the extraction pipe 15B communicate with each other within the water separator 30.

The fuel F flowing through the pipe 15C is drawn to the side of the extraction pipe 15B. Therefore, the fuel F having a high flow velocity travels downward while swirling along the inner wall 30A of the water separator 30 from the inflow port 33.

The extraction pipe 15B is provided coaxially with the water separator 30 in a center portion of a closed upper end of the water separator 30. The extraction pipe 15B may extend to a position close to the bottom portion of the water separator 30.

The flow of the fuel F traveling downward while swirling flows into the extraction pipe 15B from the bottom portion side of the water separator 30.

The fuel F in the fuel pipe 15 swirls in a spiral shape within the water separator 30. The centrifugal force acts on the swirling fuel F, so that the fuel F and the moisture having different specific gravities are centrifugally separated.

When the water separator 30 is cooled below the freezing point in a subfreezing temperature environment, the moisture separated from the fuel F solidifies on the inner wall 30A of the water separator 30. Since the inner wall 30A has the hydrophilicity, ice Ic adhering thereto can be retained. Since the moisture in the fuel F is held on the inner wall 30A, the fuel F from which the moisture is separated is returned to the extraction pipe 15B of the fuel pipe 15.

Since the moisture concentration of the fuel F passing through the water separator 30 where the ice is held on the inner wall 30A becomes lower than that before passing through the water separator 30, a required flow rate can be ensured by inhibiting the adhesion of ice to the inner wall 15A even in the extraction pipe 15B that is easily blocked.

In the present embodiment, it is also preferable to prevent the adhesion of ice to the inner wall 15A by applying the water-repellent coating or surface processing described in the first embodiment to the inner wall 15A of the fuel pipe 15.

The ice adhering to the inner wall 30A of the water separator 30 is melted after landing, and flows down along the inner wall 30A by its own weight to be accumulated around the water removal port 31. The fuel F exists in the water separator 30 in some cases, and does not exist in other cases. Even when the fuel F exists in the water separator 30, the water settles to the bottom portion of the water separator 30 based on a density difference between the fuel F and the moisture by putting the fuel F in a stationary state.

Thus, the water can be removed through the water removal port 31 by opening the water removal port 31 in maintenance or the like.

Seventh Embodiment

Next, a seventh embodiment of the present invention is described by reference to FIGS. 7A-7C.

In the seventh embodiment, a vessel 40 is arranged on the outer peripheral side of a curved section 15R provided in the fuel pipe 15.

The section 15R corresponds to an introduction portion into a heat exchanger 45 that performs heat exchange between engine oil used in the engine 13 and the fuel F. The section 15R is located immediately before the engine 13.

The vessel 40 captures the moisture (water and ice) separated on the outer peripheral side of the section 15R based on a density difference with the fuel F by a centrifugal force that acts on the fuel F flowing through the section 15R. The vessel 40 is located around a terminal of the section 15R.

The vessel 40 has an opening 40A that is formed toward an upstream side of the flow of the fuel F. The water and the ice are received into the vessel 40 from the opening 40A.

The vessel 40 can be formed in an appropriate shape capable of capturing the water and the ice into the vessel 40.

Figure 7A:
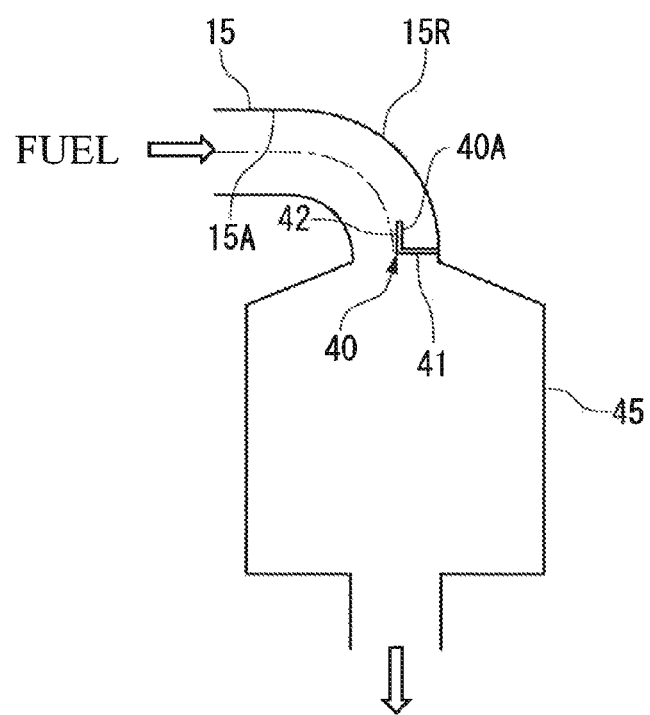
FIGS. 7A-7C are views illustrating a vessel arranged in a curved section of a fuel pipe according to a seventh embodiment of the present invention.
Figure 7B:
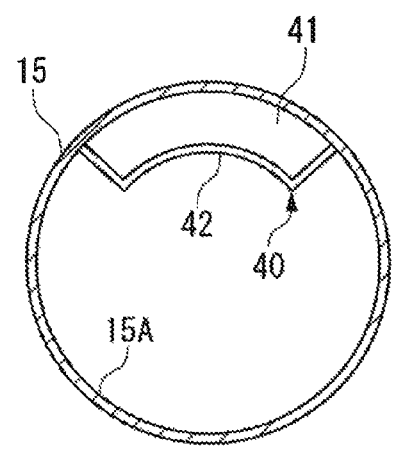
Figure 7C:
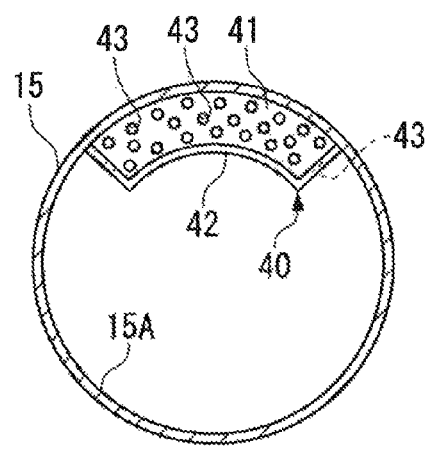

The vessel 40 of the present embodiment includes a bottom portion 41 along a radial direction of the fuel pipe 15, and a wall portion 42 that rises from a peripheral edge portion of the bottom portion 41 as shown in FIGS. 7A and 7B.

As shown in FIG. 7B, the vessel 40 is formed in a fan shape as viewed along a direction of the flow of the fuel F such that the fuel F flows on the inner peripheral side of the vessel 40.

Since the water and the ice separated from the fuel F flowing through the inside of the fuel pipe 15 in the section 15R is captured into the vessel 40, it is possible to prevent the water and the ice from being introduced into the engine 13 together with the fuel F. Particularly, when the ice is captured into the vessel 40, it is possible to prevent the ice from blocking the fuel receiving port 131 of the engine 13 to disturb fuel supply.

The ice captured by the vessel 40 is eventually melted by an increase in ambient temperature (when the aircraft parks or the like).

The vessel 40 only needs to capture at least the ice out of the water and the ice. Therefore, holes 43 that penetrate the bottom portion 41 and the wall portion 42 in a thickness direction may be formed in the vessel 40 as shown in FIG. 7C.

The holes 43 can be set to an appropriate size through which water can pass and a grain or a lump of ice having a predetermined size cannot pass.

Slits may be also formed instead of the holes 43. The vessel 40 may be formed in a mesh shape.

When the holes 43 or the slits are formed in the bottom portion 41 of the vessel 40, the fuel F passes through the openings. Thus, a pressure loss of the fuel F can be decreased.

The vessel 40 can capture a large lump of ice adhering to the inner wall 15A of the fuel pipe 15 and then falling away therefrom. That is, when the vessel 40 is installed in the curved section 15R before the engine 13, it is allowed that the moisture adheres to the inner wall 15A of the fuel pipe 15. That is, the surface finishing for imparting the water repellency may not be applied to the inner wall 15A of the fuel pipe 15 where the vessel 40 is installed.

Eighth Embodiment

Next, an eighth embodiment of the present invention is described by reference to FIG. 8.

In the eighth embodiment, a portion of an engine oil pipe 51 through which engine oil (cooling oil) used in the engine of the aircraft flows is arranged so as to enable heat dissipation to the fuel pipe 15.

Figure 8:
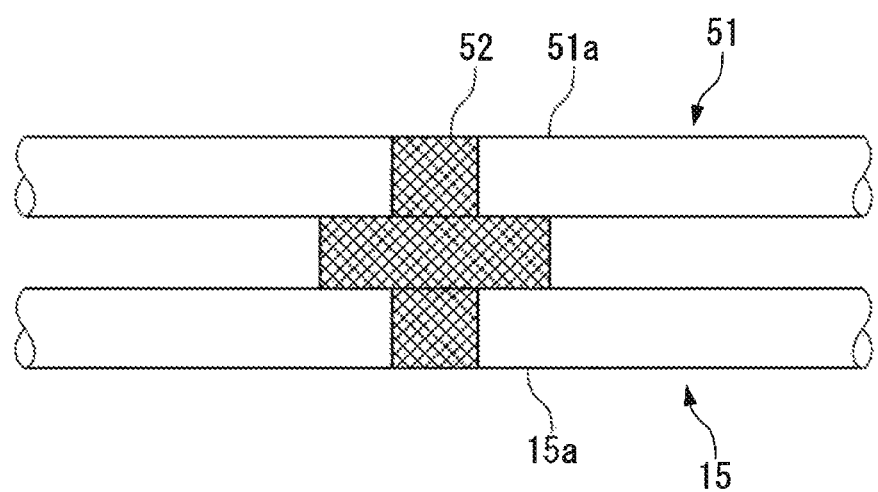

In an example shown in FIG. 8, a portion of the engine oil pipe 51 and a portion of the fuel pipe 15 are thermally coupled together via a heat transfer member 52.

The heat transfer member 52 can be configured in an appropriate form, and may also function as a joint between the engine oil pipe 51 and the fuel pipe 15.

The engine oil supplied to a high temperature portion within the engine functions as a heat source that heats one section of the fuel pipe 15.

When heat is dissipated to the fuel pipe 15 from the engine oil in the engine oil pipe 51 via the heat transfer member 52, it is possible to prevent the moisture contained in the fuel flowing through the fuel pipe 15 from freezing. The ice grain in the fuel pipe 15 can be also melted.

Figure 6A:
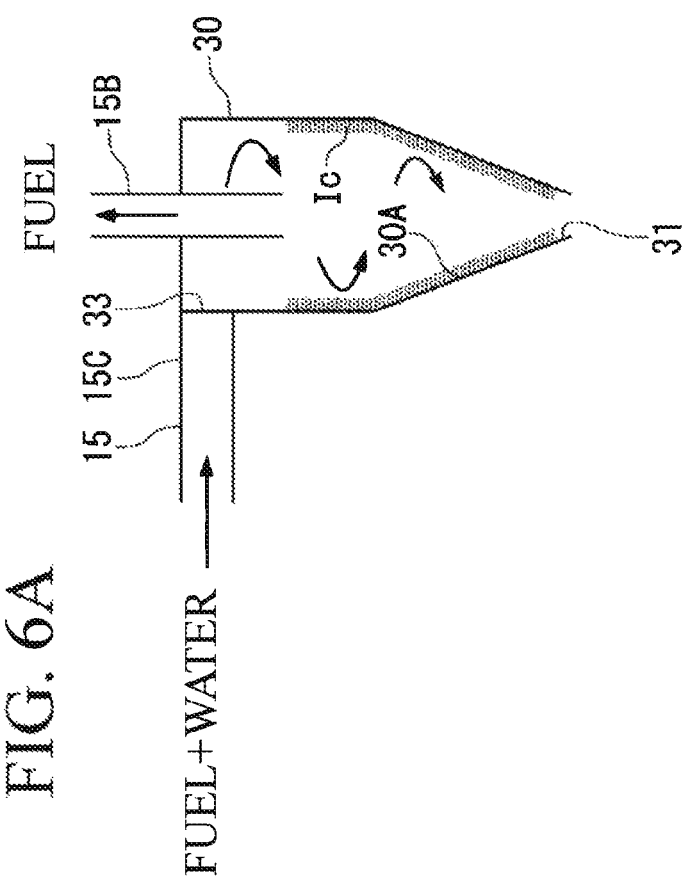

Although not shown in the drawings, the heat from the engine oil in the engine oil pipe 51 may be also dissipated to a member provided in the fuel pipe 15 and through which the fuel passes. Examples of the member through which the fuel passes include the water separator 30 in the sixth embodiment (FIGS. 6A, 6B), and the vessel 40 in the seventh embodiment (FIGS. 7A-7C).

When the heat is dissipated to the vessel 40 from the engine oil, the ice captured by the vessel 40 is melted, so that it is possible to continuously capture ice by the vessel 40.

In accordance with the present embodiment, icing in the fuel supply path can be inhibited by dissipating the heat of the engine oil that is exhaust heat of the engine to the fuel, and the supply of the fuel to the engine can be thereby ensured.

Various cooling oil such as gear cooling oil for cooling a gear incorporated in the engine may be used instead of the engine oil.

Figure 9:
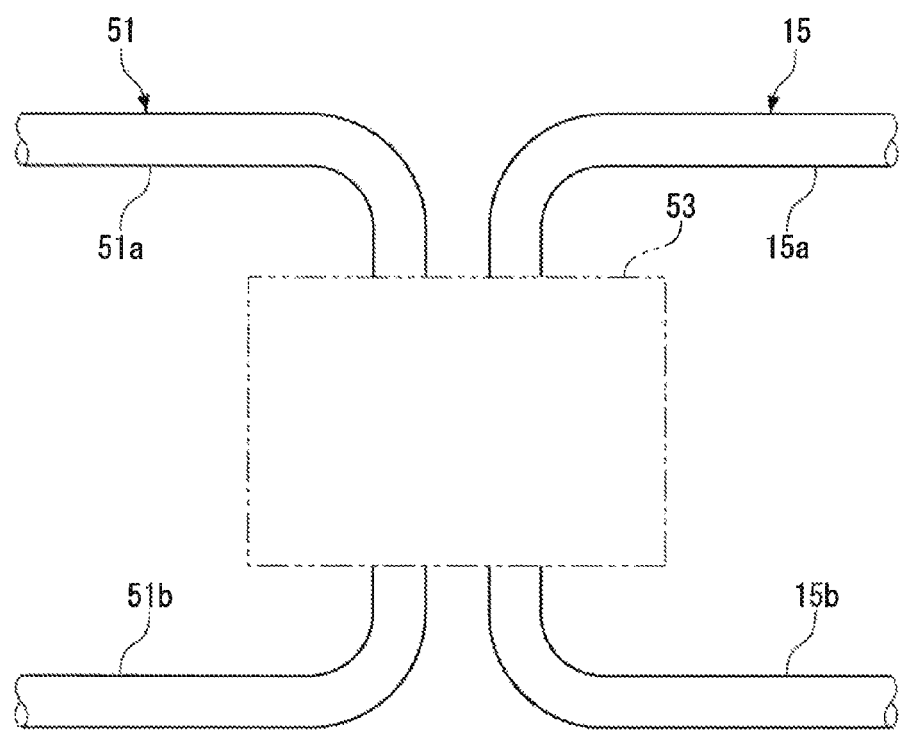
FIG. 9 is a schematic view illustrating a configuration for performing heat exchange between engine oil and fuel.

A general heat exchanger configuration as shown in FIG. 9 may be employed as a configuration for dissipating heat from a path where the cooling oil flows to a path where the fuel flows.

Fuel pipes 15a and 15b connected to a heat exchanger 53 communicate with each other in the heat exchanger 53, and engine oil pipes 51a and 51b connected to the heat exchanger 53 communicate with each other in the heat exchanger 53. It is only necessary to form a path in which the fuel and the engine oil themselves are separated from each other within the heat exchanger 53.

Engine bleed air may be also used as the exhaust heat of the engine to be dissipated to the fuel.

For example, heat may be dissipated to the fuel pipe from a downstream side of a pipe that feeds bleed air to an air conditioner or a defrosting device from the engine.

It is also possible to dissipate heat to the fuel pipe from equipment such as a heat exchanger provided in the engine.

All of the configuration in which the member (the inner wall 12A of the fuel tank 12 or the like) in contact with the fuel F within the fuel tank 12 is subjected to the surface finishing for imparting the hydrophilicity (the first embodiment and the third embodiment), the configuration in which the inner wall 15A of the fuel pipe 15 is subjected to the surface finishing for imparting the water repellency (the first embodiment and the second embodiment), the configuration in which the barrier 125 is provided on the bottom portion of the fuel tank 12 (the fourth embodiment), the configuration in which the adhesion of ice to the surface of the member in contact with the fuel F within the fuel tank 12 is promoted by transferring the fuel between the plurality of fuel tanks and thereby applying the motion to the fuel within the fuel tank (the fifth embodiment), the configuration in which the water separator 30 that separates water from the fuel F is arranged in the fuel pipe 15 (the sixth embodiment), the configuration in which the vessel capable of capturing moisture is arranged on the outer peripheral side of the curved path of the fuel pipe 15 (the seventh embodiment), and the configuration in which the exhaust heat of the engine is dissipated to the fuel (the eighth embodiment) described above contribute to suppressing the moisture amount contained in the fuel F supplied to the engine 13 and preventing the fuel supply through the fuel pipe 15 from being disturbed by the adhesion of ice or the blocking.

In order to improve the effect, it is preferable to combine two or more configurations optionally selected from the above configurations with each other.

Although the fuel tank 12 and the fuel pipe 15 of the aircraft have been described in the above respective embodiments, the present invention is not limited to the aircraft, and can be applied to transportation equipment such as ships and automobiles, or various fuel supply apparatuses used in a cold district and a low temperature environment.

When ice is actively caused to adhere to an inner wall of a fuel tank thereof, an outer wall of the fuel tank may be opened to cold outside air without covering the outer wall with a heat insulating material or the like.

In the transportation equipment, it is effective to cause ice to adhere to the inner wall of the fuel tank by introducing, toward the outer wall of the fuel tank, an airflow received when the transportation equipment itself is running, and thereby cooling the fuel tank.

In other apparatuses, an air blower can be used to blow air toward the outer wall of the fuel tank.

The present invention allows that the outer periphery of the fuel pipe is covered with a heat insulating material.

The constitutions described in the embodiments described above may be also freely selected or changed into other constitutions without departing from the scope of the present invention.

DESCRIPTION OF SYMBOLS

10 Fuel supply apparatus
12 Fuel tank
12A Inner wall (Storage fuel contact portion)
13 Engine (Fuel supply destination)
14 Fuel pump
15 Fuel pipe
15A Inner wall
15B Extraction pipe
15C Pipe
15R Section
16 Drain port
17 Coating/surface processing
18 Coating/surface processing
19 Cover
21 Inner tank
22 Outer tank
23 Transfer pump
24 Fuel passage
25 Transfer pipe
27, 28 Plate
30 Water separator
30A Inner wall
31 Water removal port
33 Inflow port
40 Vessel
40A Opening
41 Bottom portion
42 Wall portion
43 Hole(s)
45 Heat exchanger
51 Engine oil pipe
52 Heat transfer member
53 Heat exchanger
121 Upper wall
122 Lower wall 123 Side wall
124 Side wall
125 Barrier
126 Barrier
131 Fuel receiving port
151 Introduction portion
241 Inlet
242 Outlet
252 Outlet
F Fuel
R1 Region (First region)
R2 Region (Second region)

What is claimed is:

1. A fuel supply apparatus comprising:
a fuel tank that stores liquid fuel therein, wherein at least a portion of an inner wall of the fuel tank in contact with the liquid fuel is a hydrophilic surface configured to solidify water thereon;
a drain port that is fluidly coupled to the fuel tank and configured to discharge the water from the fuel tank; and
a fuel pipe attached to the fuel tank, the fuel pipe directing the liquid fuel in the fuel tank to a fuel supply destination, wherein at least a portion of an inner wall of the fuel pipe is made of a material having water repellency, or is subjected to surface finishing for imparting water repellency.

2. An aircraft comprising:
the fuel supply apparatus according to claim 1, and
an engine as the fuel supply destination.

3. The aircraft according to claim 2,
wherein a portion of a cooling oil path through which cooling oil used in the engine flows is arranged so as to enable heat dissipation to the fuel pipe or a member provided in the fuel pipe and through which the liquid fuel passes.

4. An aircraft comprising:
a fuel pipe through which fuel flows from a tank that stores the fuel to a fuel supply destination, wherein the fuel tank comprises:
a hydrophilic surface configured to solidify water thereon; and
a drain port that is fluidly coupled to the fuel tank and configured to discharge the water from the fuel tank;
an engine as the fuel supply destination;
a cooling oil pipe wherein cooling oil, used in the engine, flows therethrough; and
a heat transfer member configured to contact a portion of the fuel pipe and a portion of the cooling oil pipe, thereby thermally coupling the fuel pipe and the cooling oil pipe.

5. The aircraft according to claim 4,
wherein a member is further provided in the fuel pipe and the fuel passes through the member, and
the member and the cooling pipe are thermally coupled.

* * * * *